Jan. 26, 1954 T. R. ELLERBECK 2,667,342
METHOD OF CALCINING AND CALCINING APPARATUS
Filed Jan. 30, 1948 3 Sheets-Sheet 1
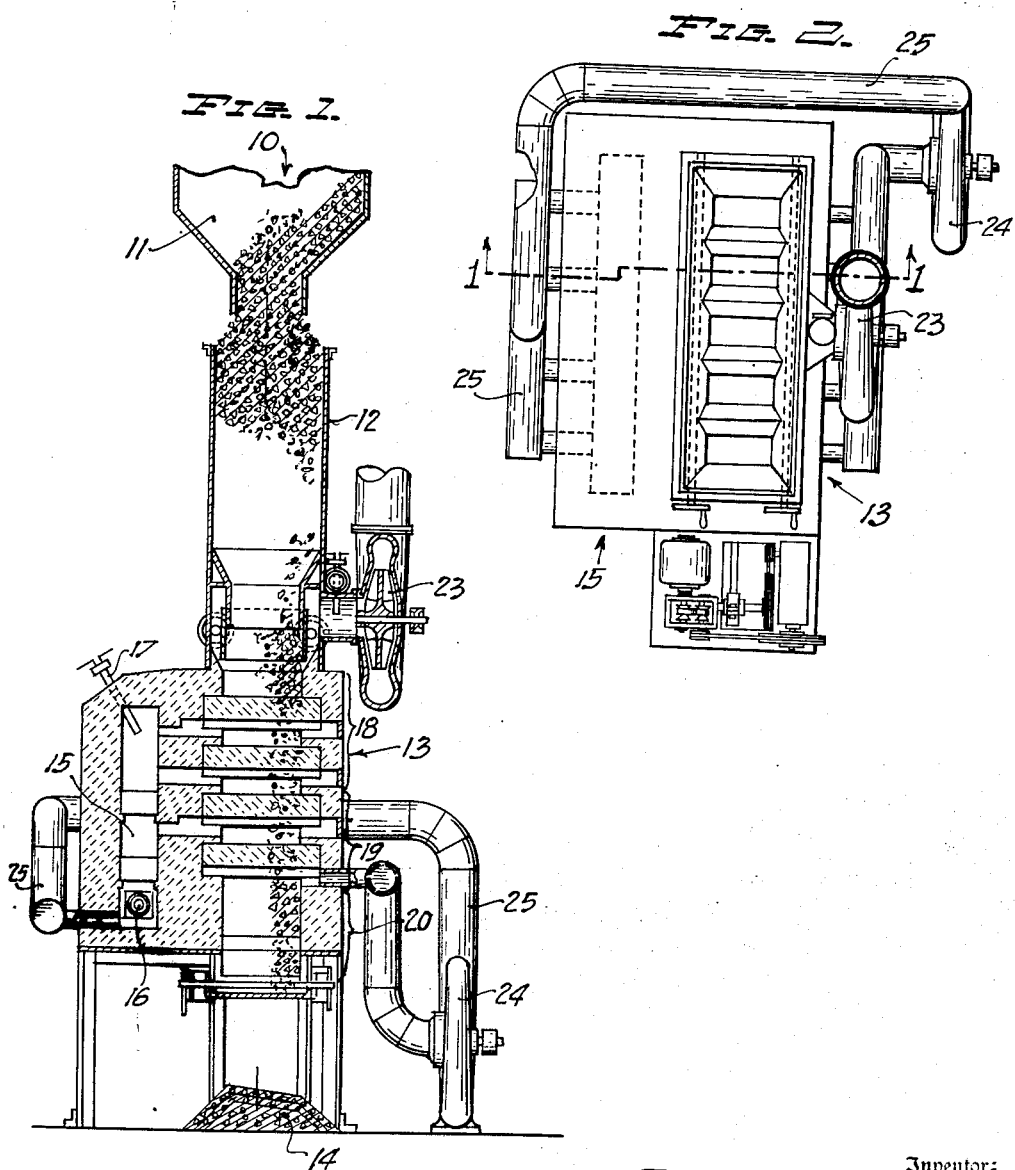
Inventor:
T. R. ELLERBECK, Jan. 26, 1954     T. R. ELLERBECK     2,667,342
METHOD OF CALCINING AND CALCINING APPARATUS
Filed Jan. 30, 1948     3 Sheets-Sheet 2
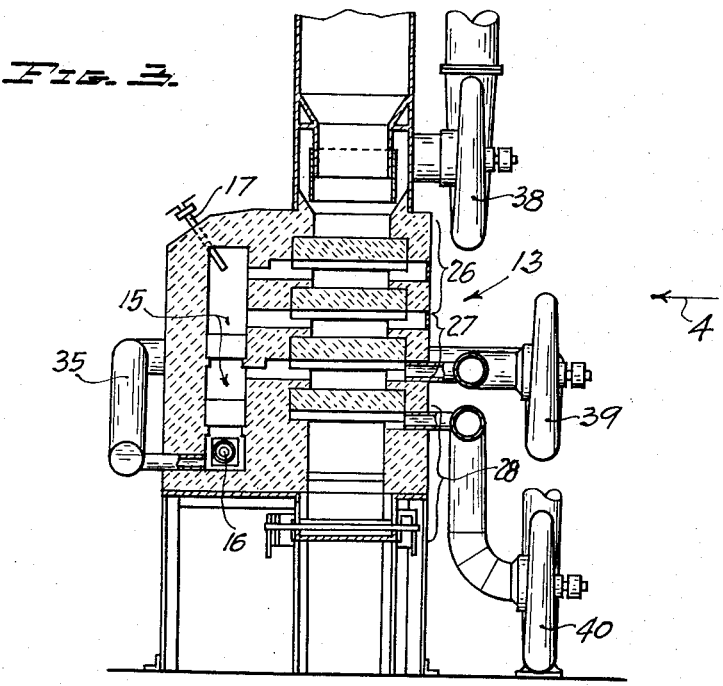
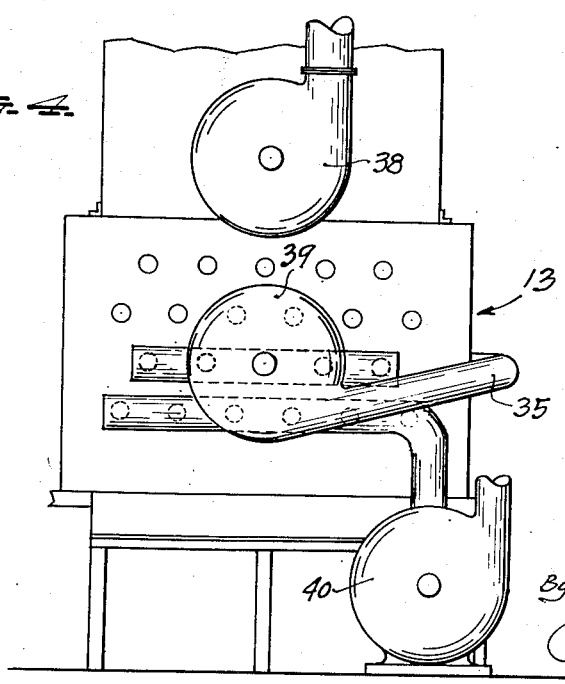
Inventor:
T. R. ELLERBECK,
Attorneys.

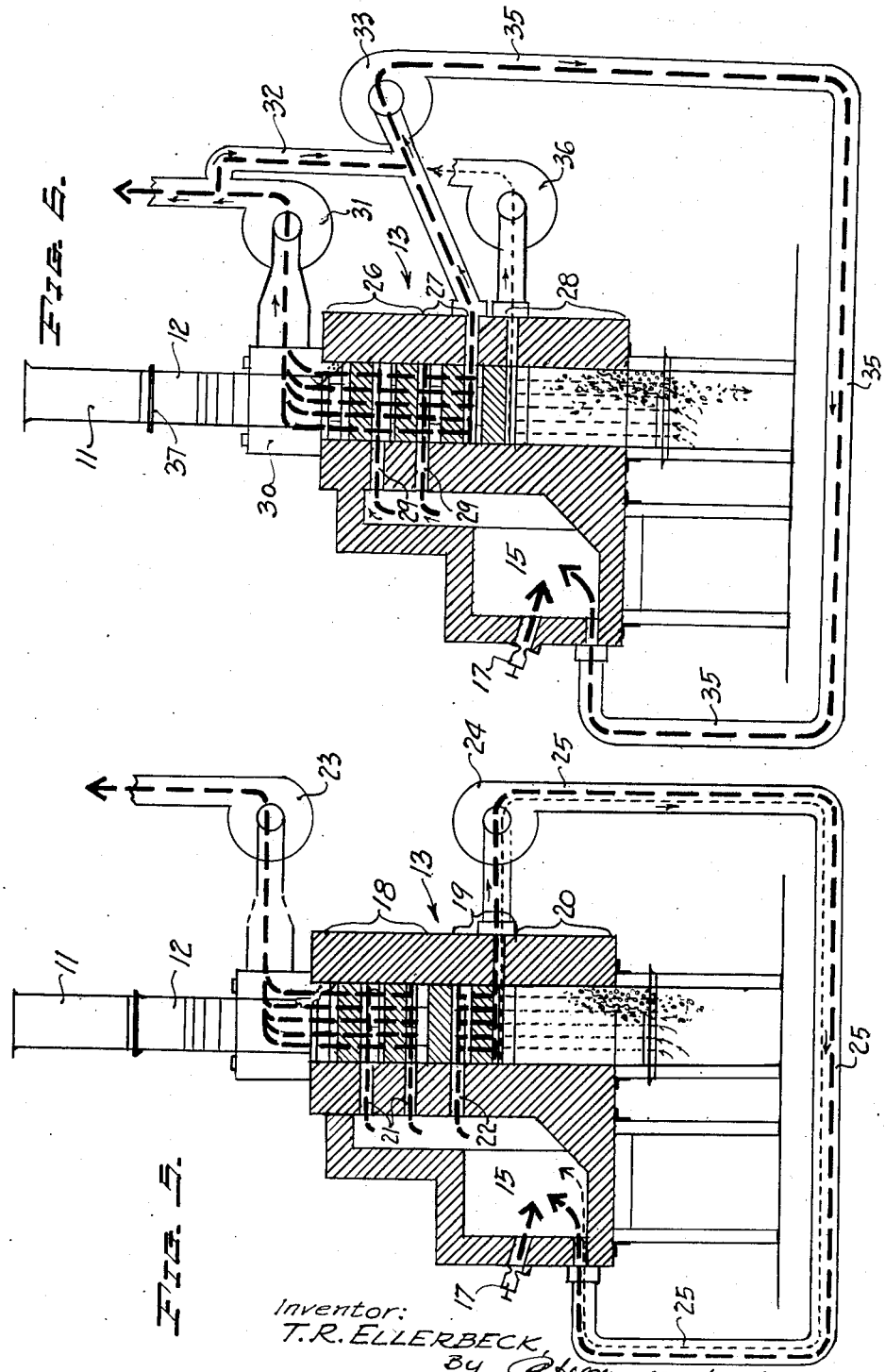

Patented Jan. 26, 1954

2,667,342

UNITED STATES PATENT OFFICE 2,667,342

METHOD OF CALCINING AND CALCINING APPARATUS

Thomas R. Ellerbeck, Salt Lake City, Utah

Application January 30, 1948, Serial No. 5,419

8 Claims. (Cl. 263—29)

This invention relates to a method of calcining and calcining apparatus.

The principal object of the invention is to effect a distinct saving in the heat requirements and therefore in the fuel cost of calcining, particularly in the calcining of limestone, over and above methods as heretofore practiced.

In general, the present invention follows the one forming the subject of U. S. patent application, Serial No. 438,047, now Patent No. 2,451,024, but embodies in connection therewith an entirely new way of handling the calcining gases. This takes into consideration that limestone cannot be transformed into lime at any temperature below approximately 1600° F. Therefore, in any process of calcining limestone, after the calcining gases have passed through the material being processed, and thus reduced in temperature to a point in the neighborhood of 1600° F., such gases are of no further use for the calcination purpose. At the same time, the heat content below 1600 degrees of the calcining gases, is useful in preheating that portion of the material in a kiln which has not yet passed into the calcining zone proper. As it happens, the contained heat in the gases leaving the calcining zone is more than ample to accomplish the preheating. If this heat is allowed to escape with the exhaust gases it is completely wasted.

In order to burn lime economically, it is necessary to salvage as much as possible of the heat in the gases that have passed through the calcining zone. To accomplish this economy, part of the calcining gases at approximately 1600 degrees may be removed from the kiln and be recirculated through the source of combustion gases or be taken through the calcining zone and there intermixed with the combustion gases.

Reclaiming the heat content, which would otherwise be wasted, has heretofore been accomplished in two ways, first, the main exhaust gases from the top hood are recirculated to the combustion chamber at a fairly low temperature; or second, a portion of the calcining gases is withdrawn from the kiln at the top of the calcining zone and recirculated to the combustion chamber at a high temperature.

According to the first method, the gases to begin with are at a temperature too low to be utilized efficiently. According to the second method, the temperatures are liable to be too high, thereby making them difficult to handle.

In the present invention an entirely new method is used, whereby the handling of the calcining zone of a kiln constitutes a radical departure from prior practice. In contradistinction to prior practice, only a portion of the calcining gases is taken through the material in the usual way. This portion does all the preheating, but only a part of the calcination. The remainder of the calcining gases, instead of being passed through the incoming raw material, is contra-fired through the partially calcined material and is withdrawn from the kiln at the cooling-air header. These contra-fired gases complete the calcination of the material and enter the cooling-air circuit at a temperature of approximately 1650 degrees. At the point of entry of the cooling gases, the contra-fired gases are mixed with the cooling air so that the resultant temperature of the recirculated gases may be held at any desired point, that point being dependent only on what percentage of the total calcining gases is allowed to be contra-fired.

By balancing the drafts in the combustion chamber, cooling-air header and hood, and by adjusting the dampers in the main exhaust gas line and the circulated gas line, any desired percentage of the calcining gases may be contra-fired and any required weight or volume of the recirculated gases can be maintained.

With low temperature calcination, there are some distinct benefits to be gained by completing the final calcination with contra-firing. When firing a kiln in the usual manner, the completely calcined lime is at the zone in which the highest gas temperatures exist, and there is danger of overburning, whereas, with contra-firing for a certain percentage of final calcination, the completely calcined lime ends up in an atmosphere of gases only slightly over the lowest feasible calcining temperature.

Inasmuch as only a fraction of the total calcining gases is contra-fired, the gas travel is quite slow through the material when completing the calcination. Opportunity exists for the heat in these slow moving gases to be efficiently utilized. This method of partial contra-firing also is the equivalent of considerably lengthening the calcining zone, but without increasing the main draft requirements. This lengthened calcining zone has a distinct advantage when calcining at lower temperatures, for the reason that more time is taken by the material in passing through this zone, and as the calcining temperature is reduced, the time required for calcination is increased.

The present invention is adapted for use with many different types of lime kilns and calcinating apparatus, but here it is convenient to illustrate its use in connection with the earlier invention disclosed in the aforementioned application for patent, Serial No. 438,047. The differences between the two inventions occur largely in the manipulation of the various drafts in order to secure the new results hereinbefore stressed. Obviously, this involves certain structural changes and modifications in the apparatus of the first invention, one embodiment of these changes being illustrated in accompanying drawings in which, Fig. 1 represents a vertical section taken on line 1—1 in Fig. 2, and relates to a kiln for the production of high quality lime;

Fig. 2, a top plan corresponding to Fig. 1;

Fig. 3, a vertical section resembling Fig. 1, but arranged for the production of gases high in $CO_2$ content;

Fig. 4, an elevation looking from the arrow 4 in Fig. 3, portions being broken away for convenience;

Fig. 5, an action diagram relating to Fig. 1; and

Fig. 6 an action diagram relating to Fig. 3.

In general the apparatus illustrated and the operation thereof are fully described in application 438,047, now U. S. Patent No. 2,451,024, so that here it is unnecessary to give more than a brief repetition thereof.

Referring to the drawings, the raw material to be calcined, such as limestone, is crushed to about 2 inches mesh and under, and deposited as denoted by the numeral 10, in a storage bin 11. From here the material descends through a feed hopper 12 into and through a calcining chamber 13, the finished product being finally discharged into a pile 14.

This invention is concerned chiefly with the processing that takes place during the passage of the material through the calcining chamber.

In the illustrated apparatus, calcining gases are generated in combustion chamber 15; the fuel, such as oil, may be introduced at various points through nozzles 16; pyrometers are indicated at 17.

With particular reference to the diagram of Fig. 5, the manipulation of drafts for normal production of high grade lime is outlined as follows. The calcining chamber, operatively, may be regarded as roughly divided into a preheating zone 18, an intermediate or calcining-proper zone 19 and a cooling zone 20. Combustion or calcining gases are introduced into the preheating zone through ports 21, and into the calcining-proper zone through port 22. Cooling air enters at a low level of zone 20. The travel of gases is indicated by the heavy dash lines, and of cooling air by the light dotted lines. Spent gases at a temperature as low as 60° F. from the preheating zone are exhausted to atmosphere through a fan 23. Hot gases from zone 19 meet and mix with cooling air, the mixture being drawn through a fan 24 and conveyed through conduit 25, back to the combustion chamber or zone for recirculation through the system.

With particular reference to the diagram of Fig. 6, the manipulation of drafts for production of gases high in $CO_2$ content is outlined as follows. Here, the calcining chamber may be regarded as divided into a preheating zone 26, a calcining-proper zone 27 and a cooling zone 28. Combustion or calcining gases are introduced through ports 29, certain portions of these gases being down-fired, or what has hereinbefore been referred to as "contra-fired" since the direction of firing is exactly contrary to usual practice where the fired gases travel upwardly, or counter to the gravity flow of the material being calcined. Those portions of the gases coming in through ports 29 which are not contra-fired, are passed through exhaust hood 30 and fan 31, and are then conducted to a point where the high-content $CO_2$ is used in any desired industrial process. Part of the main exhaust gases may be drawn through a pipe 32 for a purpose presently to be explained. Going back to the contra-fired gases, after substantially completing the calcination of material in zone 19, they are reduced in temperature to approximately 1650° F. are drawn out through fan 33, and are conveyed through conduit 34 to the combustion zone for recirculation through the system.

The aforementioned pipe 32 leads from the outflow of fan 31 into the intake of fan 33 so that the hot residual gases discharged at the bottom of zone 27 are cooled as may be desired and then conveyed through conduit 35 back to the source of combustion gases for recirculation through the system.

Cooling air is drawn through zone 28 and fan 36 and is wasted to atmosphere. The purpose of taking out the cooling air and wasting it, is to not allow it to mix with the main kiln gases which would dilute the $CO_2$ content of the main gases. Here, as in Fig. 5, the travel of gases is indicated by heavy dash lines, and of cooling air, by light dotted lines.

When operating for high $CO_2$ content gases, as just outlined, the top of feed hopper 12 is closed, for instance, by means of substantially airtight doors or lids 37 through which the kiln is charged with raw material intermittently as required, from main storage bin 11.

Obviously, each installation is provided with the proper complement of usual instruments and dampers (not shown) for regulating and controlling the operation of the kiln and the drafts connected therewith.

In Figs. 3 and 4, fans 38, 39 and 40 correspond respectively to fans 31, 33 and 36 in diagram in Fig. 6.

The subjoined table indicates the results that are obtainable if and when waste gases are removed from the calcining zone at approximately 1600° F.

FUEL REQUIREMENTS—PER TON CaO

2400° Oven temp.

| Waste Heat Saved from— | Million B. t. u. | Recirc. Gas, ° F. | Exhaust Gas, ° F. | Gal. Oil |
|---|---|---|---|---|
| None | 6.25 | | 600 | 42 |
| Hot Lime | 5.5 | 350 | 600 | 36½ |
| Lime and 12½% Spent Gases | 4.9 | 580 | 480 | 33 |
| Lime and 25% Spent Gases | 4.3 | 810 | 247 | 28½ |
| Lime and 34% (Theoretical Max.) Spent Gases | 3.8 | 970 | 60 | 26 |

Broadly, the invention is applicable in many different calcination operations, but is especially so in the burning of limestone to produce lime, and if desired, high $CO_2$ content gases.

The foregoing description is limited in scope only by the terms of the following claims.

Having fully described the invention what is claimed is:

1. A method of calcining, comprising the steps of causing material for calcining to flow downwardly through a substantially vertically extending calcining zone; introducing calcining gases into said material intermediate the height of said calcining zone; forcing a portion of said calcining gases to flow downwardly in said calcining zone co-current with the downward flow of said material; causing a portion of said calcining gases to flow upwardly through the calcining zone counter-current to the downward flow of said material; and exhausting said upwardly flowing gases adjacent the top of said calcining zone.

2. A method of burning limestone, comprising the steps of causing limestone to flow downwardly through a substantially vertically extending calcining zone; introducing calcining gases into said limestone intermediate the height of said calcining zone; forcing a portion of said calcining gases to flow downwardly in said calcining zone co-current with the downward flow of said limestone; causing a portion of said calcining gases to flow upwardly through the calcining zone counter-current to the downward flow of said limestone; and exhausting said upwardly flowing gases adjacent the top of said calcining zone.

3. A method of calcining, comprising causing material for calcining to flow in a given direction through a calcining zone; flowing calcining gases along a portion of the length of said calcining zone counter-current to said flow of material; flowing additional calcining gases along the remainder of the length of said calcining zone co-current with the said flow of material; and exhausting the said counter-current and co-current gas flows from said calcining zone adjacent opposite ends thereof.

4. The method set forth in claim 3, wherein the gases exhausted from the co-current portion of the calcining zone are re-circulated through the calcining zone.

5. The method set forth in claim 4, wherein the calcining gases introduced into the said counter-current and the said co-current portions of the calcining zone are derived from a common source, and the said re-circulated gases re-enter the said common source before re-circulation.

6. The method set forth in claim 3, wherein the material is crushed limestone.

7. Calcining apparatus, comprising a kiln of vertical shaft type divided nominally into an upper pre-heating zone, an intermediate calcining zone, and a lower cooling zone; a source of calcining gases communicating with said calcining zone intermediate the height thereof; gas exhaust means leading from said pre-heating zone; gas exhaust means, including a suction fan, leading from said calcining zone at a location disposed effectively below the said communication of the source of calcining gases therewith, and adjacent the bottom thereof, to provide a down-fired section of said calcining zone; a return conduit leading from the said calcining zone exhaust means to said source of calcining gases; means for feeding material into said kiln above the said pre-heating zone; and means for regulating the respective quantities of gases exhausted by the said exhaust means.

8. Calcining apparatus, comprising a kiln of vertical shaft type divided nominally into an upper pre-heating zone, an intermediate calcining zone, and a lower cooling zone; a source of calcining gases communicating with said calcining zone intermediate the height thereof; gas exhaust means leading from said pre-heating zone; gas exhaust means, including a suction fan, leading from said calcining zone at a location disposed effectively below the said communication of the source of calcining gases therewith, and adjacent the bottom thereof, to provide a down-fired section of said calcining zone; a return conduit leading from the said calcining zone exhaust means to said source of calcining gases; a second return conduit leading from the said pre-heating zone exhaust means to the said calcining zone exhaust means; a third exhaust means leading from the top of said cooling zone, to withdraw air from the said cooling zone and exhaust the same; and means for feeding material into said kiln above the said pre-heating zone.

THOMAS R. ELLERBECK.

References Cited in the file of this patent

UNITED STATES PATENTS

| Number | Name | Date |
|---|---|---|
| 692,257 | Eldred | Feb. 4, 1902 |
| 1,158,371 | Carnie | Oct. 26, 1915 |
| 1,304,514 | Schmatolla | May 20, 1919 |
| 1,513,622 | Manning | Oct. 28, 1924 |
| 1,695,224 | Besta | Dec. 11, 1928 |
| 1,832,552 | Haslam | Nov. 17, 1931 |
| 1,912,811 | Wechter | June 6, 1933 |
| 1,961,311 | Uhle et al. | June 5, 1934 |
| 2,037,809 | MacMullin | Apr. 21, 1936 |
| 2,170,745 | Brush | Aug. 22, 1939 |
| 2,189,194 | Brush | Feb. 6, 1940 |
| 2,199,384 | Azbe | May 7, 1940 |
| 2,345,067 | Osann | Mar. 28, 1944 |
| 2,370,281 | Azbe | Feb. 27, 1945 |
| 2,409,527 | Azbe | Oct. 15, 1946 |
| 2,436,157 | Westling | Feb. 17, 1948 |
| 2,521,830 | Collins | Sept. 12, 1950 |